(12) United States Patent
Iwashita et al.

(10) Patent No.: US 7,845,205 B2
(45) Date of Patent: Dec. 7, 2010

(54) DIE CUSHION CONTROLLER

(75) Inventors: Yasusuke Iwashita, Yamanashi (JP);
Tadashi Okita, Yamanashi (JP);
Hiroyuki Kawamura, Yamanashi (JP);
Satoshi Ikai, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 952 days.

(21) Appl. No.: 11/550,330

(22) Filed: Oct. 17, 2006

(65) Prior Publication Data

US 2007/0084264 A1 Apr. 19, 2007

(30) Foreign Application Priority Data

Oct. 18, 2005 (JP) .............................. 2005-302932

(51) Int. Cl.
*B21J 9/18* (2006.01)
*B21J 7/46* (2006.01)

(52) U.S. Cl. ............................ 72/454; 72/443; 72/21.1; 72/21.4

(58) Field of Classification Search .................. 72/20.1, 72/21.1, 21.4, 443, 350–351, 453.01–453.19, 72/454
See application file for complete search history.

(56) References Cited

U.S. PATENT DOCUMENTS

| | | | | |
|---|---|---|---|---|
| 5,107,193 | A * | 4/1992 | Iwashita | 318/560 |
| 5,435,166 | A | 7/1995 | Sunada | |
| 6,902,386 | B2 | 6/2005 | Uchiyama et al. | |
| 7,030,585 | B2 * | 4/2006 | Iwashita et al. | 318/567 |
| 7,392,684 | B2 * | 7/2008 | Iwashita et al. | 72/454 |
| 7,415,862 | B2 * | 8/2008 | Futamura et al. | 72/454 |
| 7,739,894 | B2 * | 6/2010 | Suzuki | 72/454 |
| 2004/0005378 | A1 * | 1/2004 | Uchiyama et al. | 425/542 |

(Continued)

FOREIGN PATENT DOCUMENTS

CN 1470375 1/2004

(Continued)

OTHER PUBLICATIONS

Chinese Office Action for Application No. 200610135712X mailed Dec. 7, 2007.

(Continued)

*Primary Examiner*—Dana Ross
*Assistant Examiner*—Mohammad Yusuf
(74) *Attorney, Agent, or Firm*—Lowe Hauptman Ham & Berner, LLP

(57) ABSTRACT

A die cushion controller, for driving a die cushion, disposed in opposition to a slide of a press machine, by controlling a servo motor, including: a pressure command portion which prepares a pressure command value for exerting a predetermined pressure to a press material disposed between the slide and the die cushion; a pressure detecting portion which detects an actual pressure exerted on the press material; a speed correction value preparing portion which prepares a speed correction value by multiplying a differential value of the pressure command value prepared by the pressure command portion by a coefficient; and a first speed command portion which prepares a speed command value to be instructed to the servo motor based on the pressure command value prepared by the pressure command portion, the actual pressure detected by the pressure detecting portion, and the speed correction value prepared by the speed correction value preparing portion.

5 Claims, 8 Drawing Sheets

U.S. PATENT DOCUMENTS

2005/0274243 A1 * 12/2005 Shiroza et al. ............ 83/13

FOREIGN PATENT DOCUMENTS

| CN | 1527170 | | 9/2004 |
| EP | 1378806 | A1 | 1/2004 |
| EP | 1437637 | A2 * | 7/2004 |
| JP | 7-195129 | A | 8/1995 |
| JP | 10-202327 | A | 8/1998 |
| JP | 2004276028 | A | 10/2004 |

OTHER PUBLICATIONS

EP Search Report for 06021527 dated Aug. 11, 2009.

* cited by examiner

DIE CUSHION CONTROLLER

RELATED APPLICATION

The present application is based on, and claims priority from, Japanese Application Number 2005-302932, filed Oct. 18, 2005, the disclosure of which is hereby incorporated, by reference, in its entirety.

BACKGROUND OF THE INVENTION

1. Field of the Invention

The present invention relates to a die cushion controller used for controlling the pressure, exerted on a press material that is pressed between a vertical pair of dies by relatively moving a die cushion disposed in opposition to a slide of a press machine, using a servo motor as a driving source, 2. Description of the Related Art Conventionally, as an example of a die cushion apparatus comprising a die cushion disposed in opposition to a slide of a press machine and a controller for moving die cushion relative to the slide using an air cylinder as a driving source, there is the one disclosed in Japanese Unexamined Patent Publication No. 7-195129 (JP-A-7-195129). The die cushion as disclosed in the Patent Document operates by converting rotational motion of a servo motor via a conversion mechanism to a reciprocating motion of an air cylinder, and pressure exerted on a press material between a vertical pair of dies can be adjusted by controlling torque of the servo motor with a controller.

However, a die cushion apparatus using an air cylinder as a driving source is likely to produce a time delay in response to a control signal, and is therefore unable to cancel the variation in the response to instantaneous pressure variation in a short time period, and is thus difficult to control.

As another example, a die cushion apparatus using a servo motor as a driving source is disclosed in Japanese Unexamined Patent Publication No. 10-202327 (JP-A-10-202327). The die cushion device described in the Patent Document attempts to overcome above-mentioned problem by improving the response to the control, and includes a servo motor, a gear transmission mechanism for transmitting the driving force of the servo motor to a ball screw, a die cushion moved in reciprocating motion by rotation of the ball screw, and a controller for controlling the servo motor. The servo motor is controlled, by the controller, such that a press material can be press molded in a desired shape, without a defect, between the vertical pair of dies at a predetermined pressure.

The die cushion apparatus having a servo motor as a driving source has a small time delay and excellent follow-up performance in the response to pressure variation in a short time period, and thus permits the pressure command value to be changed freely between the so-called mold closing and the mold opening. None-the-less, a further improvement in the follow-up performance is desirable. For example, in press molding of powder material to obtain a compact of a complex shape, a controller having excellent follow-up performance to pressure command (control response) is required. It is possible to improve the follow-up performance by increasing the pressure gain (ratio of pressure command value to speed command value) or the speed gain (ratio of speed command ratio to current command ratio) to some extent, but there is an inherent limitation to this approach.

SUMMARY OF THE INVENTION

In view of above-described problem, it is an object of the present invention to provide a die cushion controller that is capable of improving a follow-up performance in the response to a change of pressure command value during press molding.

In order to attain above object, the present invention provides a die cushion controller for driving a die cushion disposed in opposition to a slide of a press machine by controlling a servo motor, comprising: a pressure command portion which prepares a pressure command value for exerting a predetermined pressure to a press material disposed between the slide and the die cushion; a pressure detecting portion which detects an actual pressure exerted on the press material; a speed correction value preparing portion which prepares a speed correction value by multiplying a differential value of the pressure command value prepared by the pressure command portion by a coefficient; and a first speed command portion which prepares a speed command value to be instructed to the servo motor based on the pressure command value prepared by the pressure command portion, the actual pressure detected by the pressure detecting portion, and the speed correction value prepared by the speed correction value preparing portion.

The above die cushion controller may further comprise a speed detecting portion which detects an actual rotational speed of the servo motor; a current correction value preparing portion which prepares a current correction value by multiplying a second order differential value of the pressure command value prepared by the pressure command portion by a coefficient; and a current command portion which prepares a current command value to be instructed to the servo motor based on the speed command value prepared by the first speed command portion, the actual rotational speed detected by the speed detecting portion, and the current correction value prepared by the current correction value preparing portion.

The above die cushion controller may further comprise a position command portion which prepares a position command value to be instructed to the servo motor which moves the die cushion to a predetermined position; a position detecting portion which detects an actual position of the die cushion; a second speed command portion which prepares a second speed command value to be instructed to the servo motor based on the position command value prepared by the position command portion and the actual position detected by the position detecting portion; and a control mode switching portion for switching between the first speed command portion and the second speed command portion.

Further, the present invention provides a die cushion controller for driving a die cushion disposed in opposition to a slide of a press machine by controlling a servo motor, comprising: a pressure command portion which prepares a pressure command value for exerting a predetermined pressure to a press material disposed between the slide and the die cushion; a pressure detecting portion which detects an actual pressure exerted on the press material; a first speed command portion which prepares a speed command value to be instructed to the servo motor based on the pressure command value prepared by the pressure command portion and the actual pressure detected by the pressure detecting portion; a speed detecting portion which detects an actual rotational speed of the servo motor; a current correction value preparing portion which prepares a current correction value by multiplying a second order differential value of the pressure command value prepared by the pressure command portion by a coefficient; and a current command portion which prepares a current command value to be instructed to the servo motor based on the speed command value, the actual rotational speed detected by the speed detecting portion, and the current correction value prepared by the current correction value preparing portion.

BRIEF DESCRIPTION OF THE DRAWINGS

These and other objects and features of the present invention will become clearer from the following description of the preferred embodiments given with reference to the attached drawings, wherein.

DETAILED DESCRIPTION

Next, the present invention will be described in detail with reference to drawings showing specific examples of embodiments of the present invention.

A die cushion controller 7A-7D is provided in a die cushion apparatus 4A-4D of a press machine 1A-1D, and is used to control a pressure exerted on a press material 2 pressed between an unshown vertical pair of dies during press molding.

The press machine 1A-1D includes a slide 3 which supports an upper die facing downward and can freely reciprocate in vertical direction, and a die cushion apparatus 4A-4D which supports a lower die facing upward in opposition to the upper die and exerts a specified pressure to the press material 2 pressed between the vertical pair of dies. The pressure exerted on the press material 2 is adjusted by controlling relative position of the die cushion apparatus 4A-4D to the slide 3 directly or indirectly by the die cushion controller 7A-7D.

The die cushion apparatus 4A-4D includes a servo motor 6 as a driving source, an unshown power transmission mechanism for transmitting the driving force of the servo motor 6 to a ball screw, a die cushion 5 that is moved axially in reciprocating motion by rotation of the unshown ball screw, and a die cushion controller 7A-7D for controlling the servo motor 6. As the power transmission mechanism, a belt transmission mechanism or a gear transmission mechanism, as described in JP-A-10-202327 as a previous example, for example, can be applied. The driving force of the servo motor 6 is adapted to be transmitted via an unshown speed reduction gear to the ball screw in order to increase output torque at reduced speed.

Figure 1:
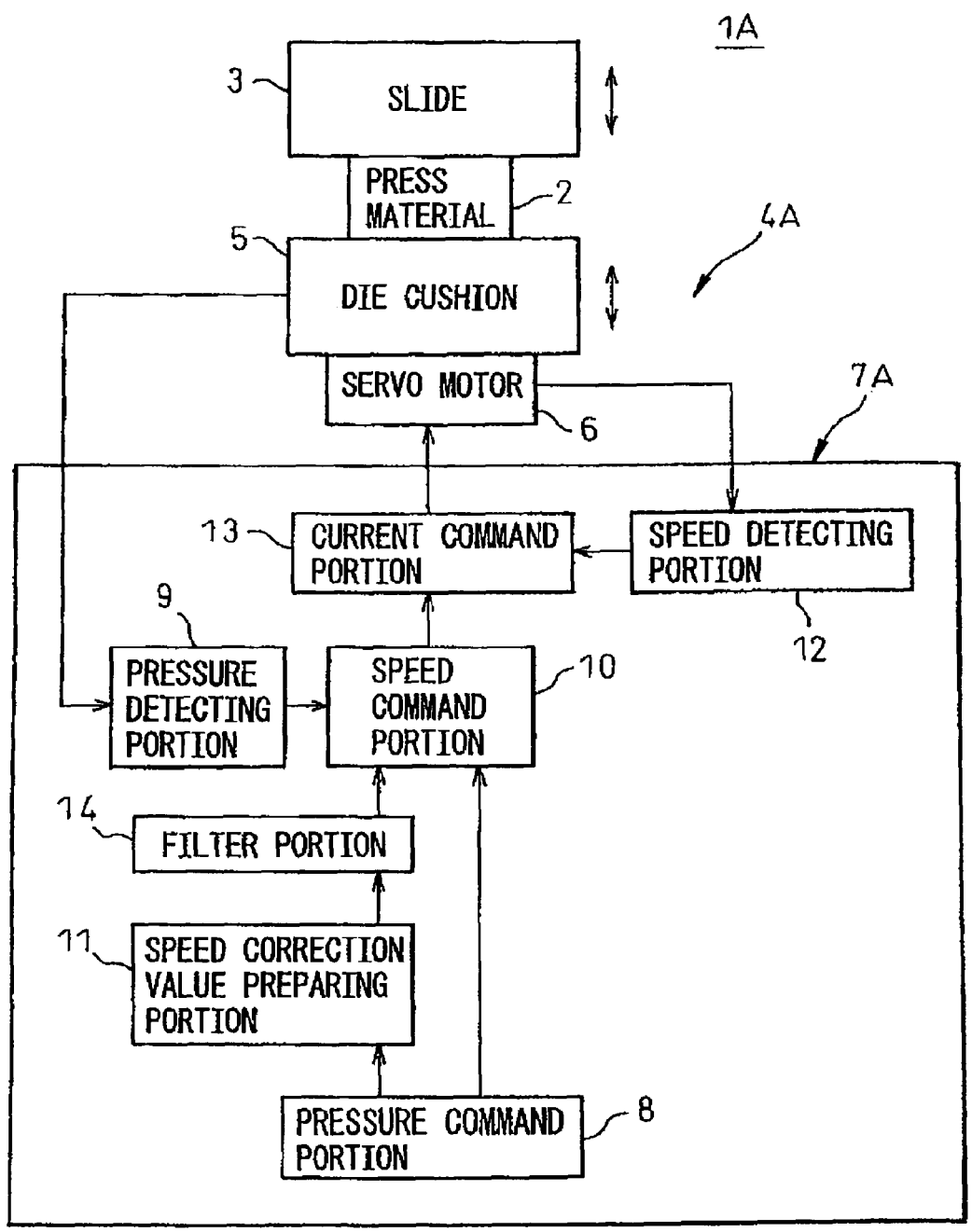
FIG. 1 is a view showing the construction of a die cushion controller according to a first embodiment of the present invention.
Figure 2:
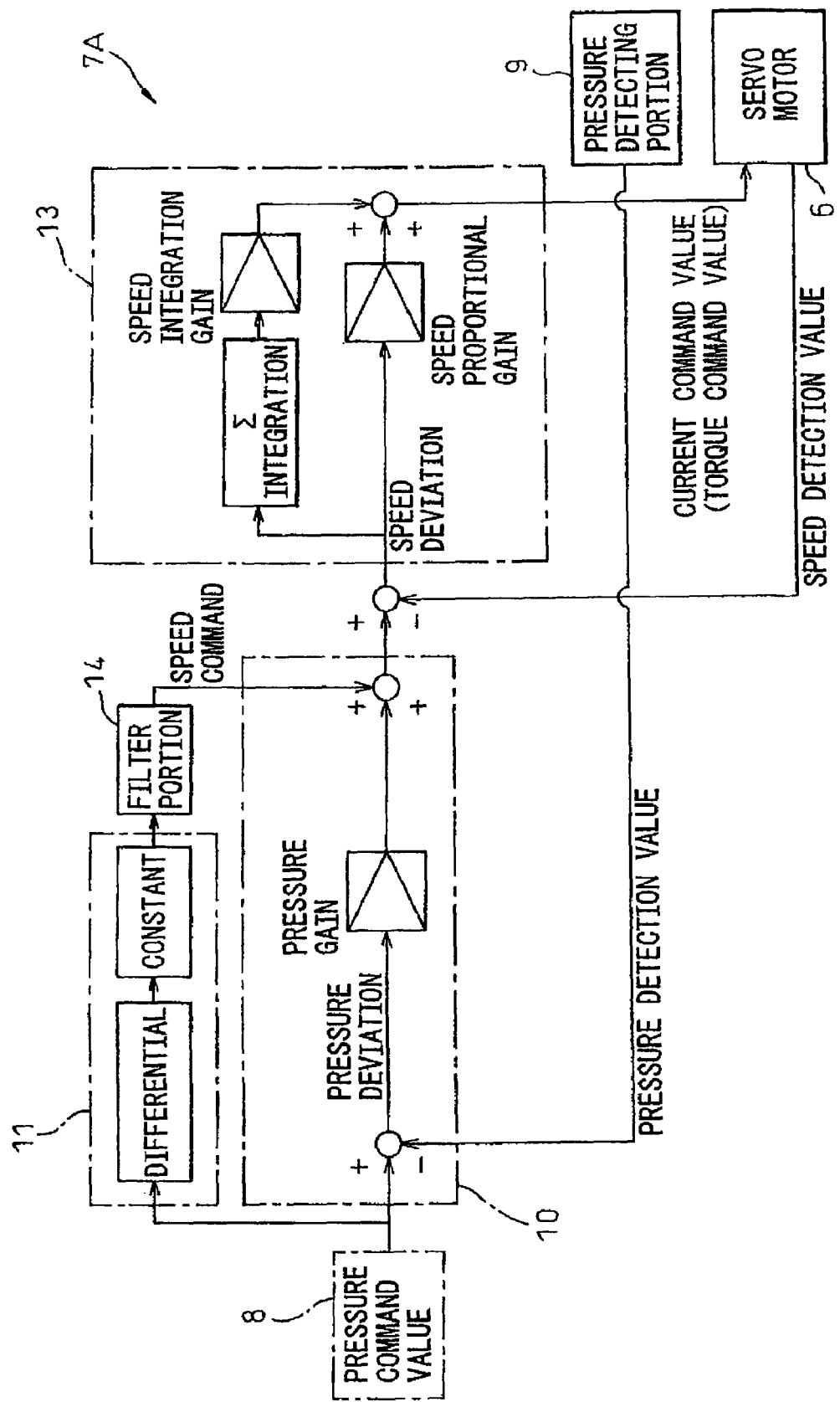
FIG. 2 is a block diagram showing the die cushion controller of FIG. 1.

The die cushion controller 7A according to a first embodiment as shown in FIGS. 1 and 2 includes a pressure command portion 8 which prepares a pressure command value for exerting pressure to the press material 2, a pressure detecting portion 9 for detecting a actual pressure exerted on the press material 2, a speed command portion (first speed command portion) 10 which prepares speed command value to be instructed to servo motor 6 based on the pressure command value and the actual pressure detected by the pressure detecting portion 9 for performing pressure control, a speed correction value preparing portion 11 which prepares a speed correction value by multiplying a differential value of the pressure command value by a coefficient and add this correction value via a filter portion 14 to the speed command value, a speed detecting portion 12 for detecting a rotational speed of the servo motor 6, and a current command portion 13 which prepares a current command value to be instructed to the servo motor 6 based on the speed command value and the speed detection value detected by the speed detecting portion 12. As the filter portion, a low pass filter which can delay the rise timing of a speed correction value having discontinuity and reduce the slope of the rise by rounding the corner of the impulse signal waveform, may be used.

The pressure command portion 8 freely controls the pressure exerted on the press material 2 during press working by preparing the pressure command value and controlling the servo motor 6 based on the prepared pressure command value. The control of the servo motor 6 based on the pressure command value is distinguished from the position control of the servo motor 6 based on a position command value to be described later, and may be called as pressure control. The die cushion apparatus 4A having the servo motor 6 as a driving source is characterized by the pressure control performed by the die cushion controller 7A, and permits press processing of a complex shape to be performed without defect by freely controlling the exerted pressure during press working, which has been difficult with conventional die cushion apparatus using an air cylinder or the like.

The pressure detecting portion 9 may be composed of, for example, a pressure sensor, a load cell, or the like, and is provided on the die cushion 5 for detecting actual pressure exerted on the press material 2 during press working. A pressure deviation as difference between the pressure command value and the actual pressure can be determined by feed-back of the actual pressure detected by the pressure detecting portion 9 to the pressure command value (see FIG. 2).

The speed command portion 10 is constituent which prepares speed command value by multiplying the pressure deviation, which is the difference between the pressure command value and the actual pressure, by a pressure gain. The pressure gain may vary in dependence upon the press area of the press material 2, the equivalent spring constant of the die cushion 5 corresponding to the spring element, and the like.

The speed correction value preparing portion 11 is a constituent which prepares a speed correction value that increases or decreases in dependence upon the variation of the pressure command value during press working, and adds this speed correction value to the speed command value so as to improve the follow-up performance of the control system relative to the pressure variation. Thus, the speed correction value is large when the pressure command value inputted to the control system is large, and is small when the pressure command value is small. The constant (see FIG. 2) is a coefficient for converting the dimension of the speed correction value to the dimension of the speed command value, and is determined depending upon the press area of the press material 2, the equivalent spring constant of the die cushion 5 corresponding to the spring element, and the like.

The speed detecting portion 12 is composed of, for example, a rotary encoder, a tacho-generator, or the like, and is provided to the servo motor 6 for detecting the actual rotational speed of the servo motor 6 during press working.

The current command portion 13 is constituent which adds to the current command value obtained by multiplying a speed deviation that is the difference between the speed command value and the actual speed by a speed-proportional gain, an integrated value of the speed deviation multiplied by a speed integration gain, and supply the added current command value to the servo motor 6. The speed proportional gain is a proportional constant determined from the relation between the rotational speed of the servo motor 6 and the current value.

Thus, in accordance with the first embodiment, the speed correction value obtained by multiplying the differential value of the pressure command value by a coefficient is added to the speed command value by using the speed correction value preparing portion 11. Therefore, a change of the pressure command value can be reflected in the speed command value, so that the follow-up performance of the servo motor 6, with respect to the change of the pressure command value during the press working, can be improved. As speed correction value is added via the filter portion 14 to the speed command value, the rise timing of the speed correction value can be delayed, and the corner of the impulse-like waveform of the signal can be rounded to reduce the slope of the rise. Shock, to the object to be controlled, can be thereby reduced, and the servo motor can be operated smoothly.

Figure 3:
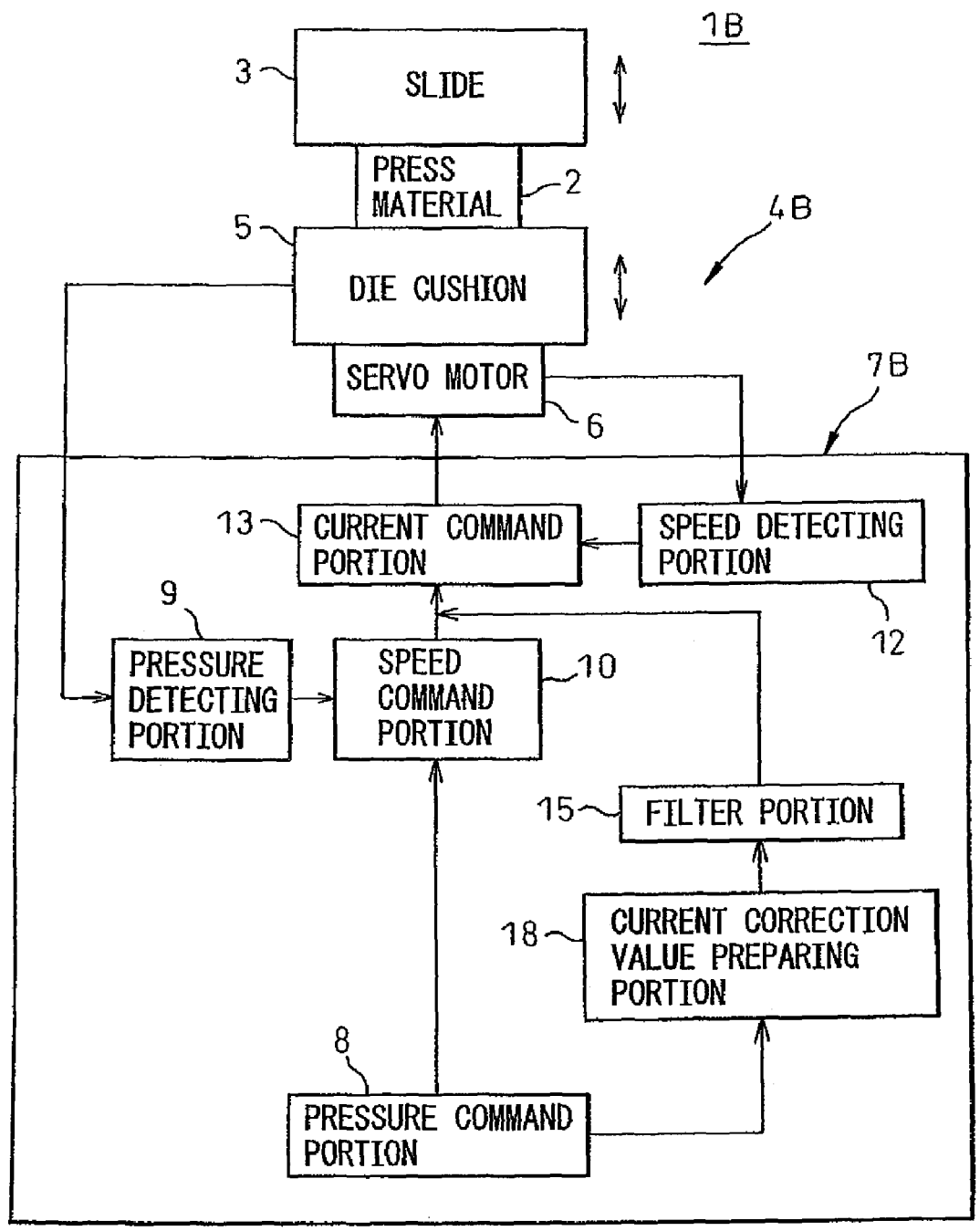
FIG. 3 is a view showing the construction of a die cushion controller according to a second embodiment of the present invention.
Figure 4:
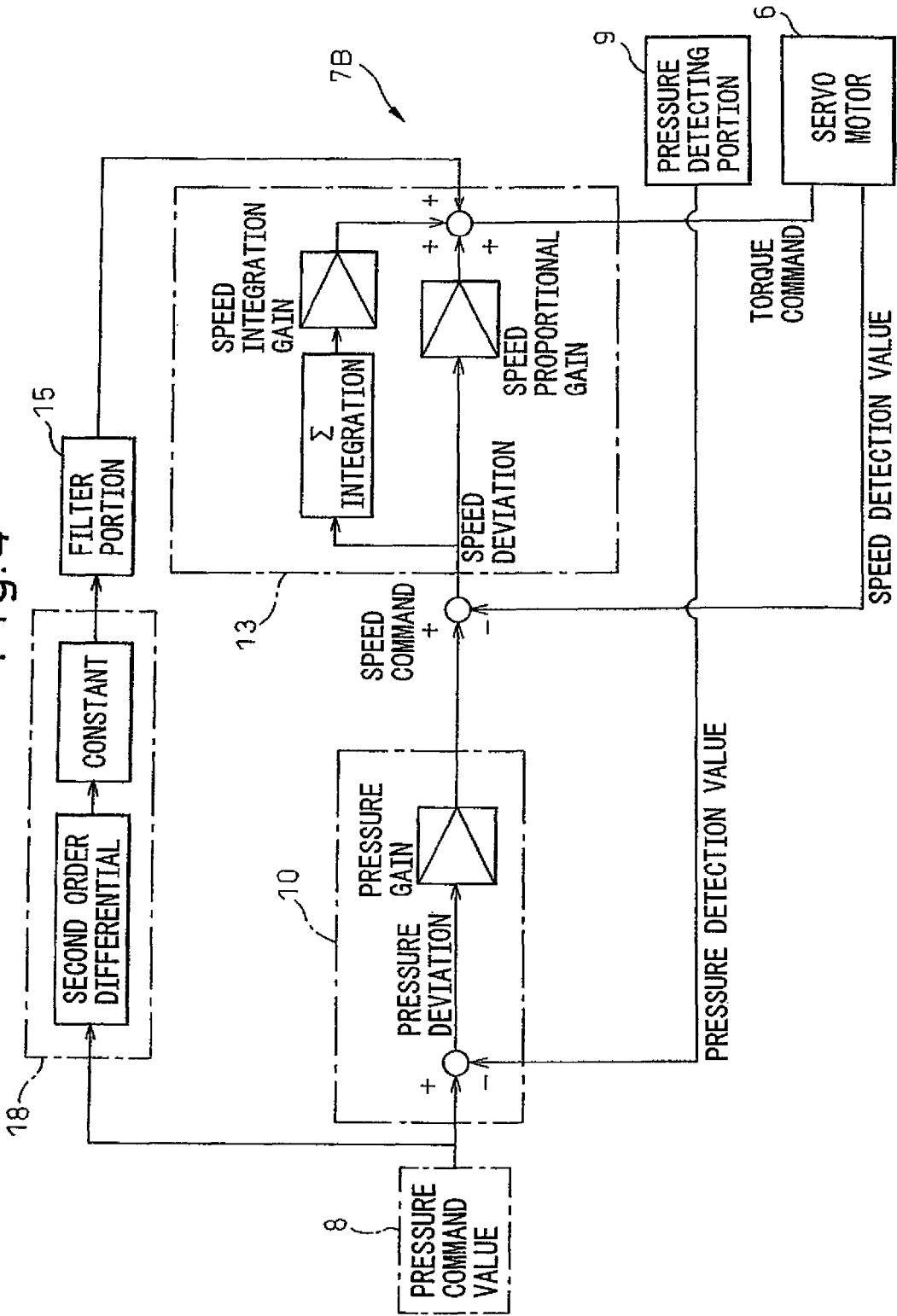
FIG. 4 is a block diagram showing the die cushion controller of FIG. 3.

Next, referring to FIGS. 3 and 4, a die cushion controller according to a second embodiment of the present invention will be described. Constituents common to the present embodiment and the first embodiment are denoted by same reference numerals and symbols, and an explanation thereof is omitted.

A die cushion controller 7B of the present embodiment is different from the first embodiment in that a current correction value preparing portion 18 is provided in place of the speed correction value preparing portion 11 of the die cushion controller 7A of the first embodiment. As shown in FIG. 3, the current correction value preparing portion 18 is provided between the pressure command portion 8 and the current command portion 13. In the current correction value preparing portion 18, as shown in FIG. 4, a current correction value is calculated by multiplying a second order differential value of the pressure command value by a constant. The current correction value is added to the current command value after being subjected to filter processing in the same filter portion 15 as in the first embodiment.

The current correction value is large when the pressure command value inputted to the control system is large, and small when the pressure command value is small. Thus, the current correction value is prepared as a value that increases or decreases in dependence on the change of the pressure command value, so that the follow-up performance of the control system with respect to pressure variation can be thereby improved.

Figure 5:
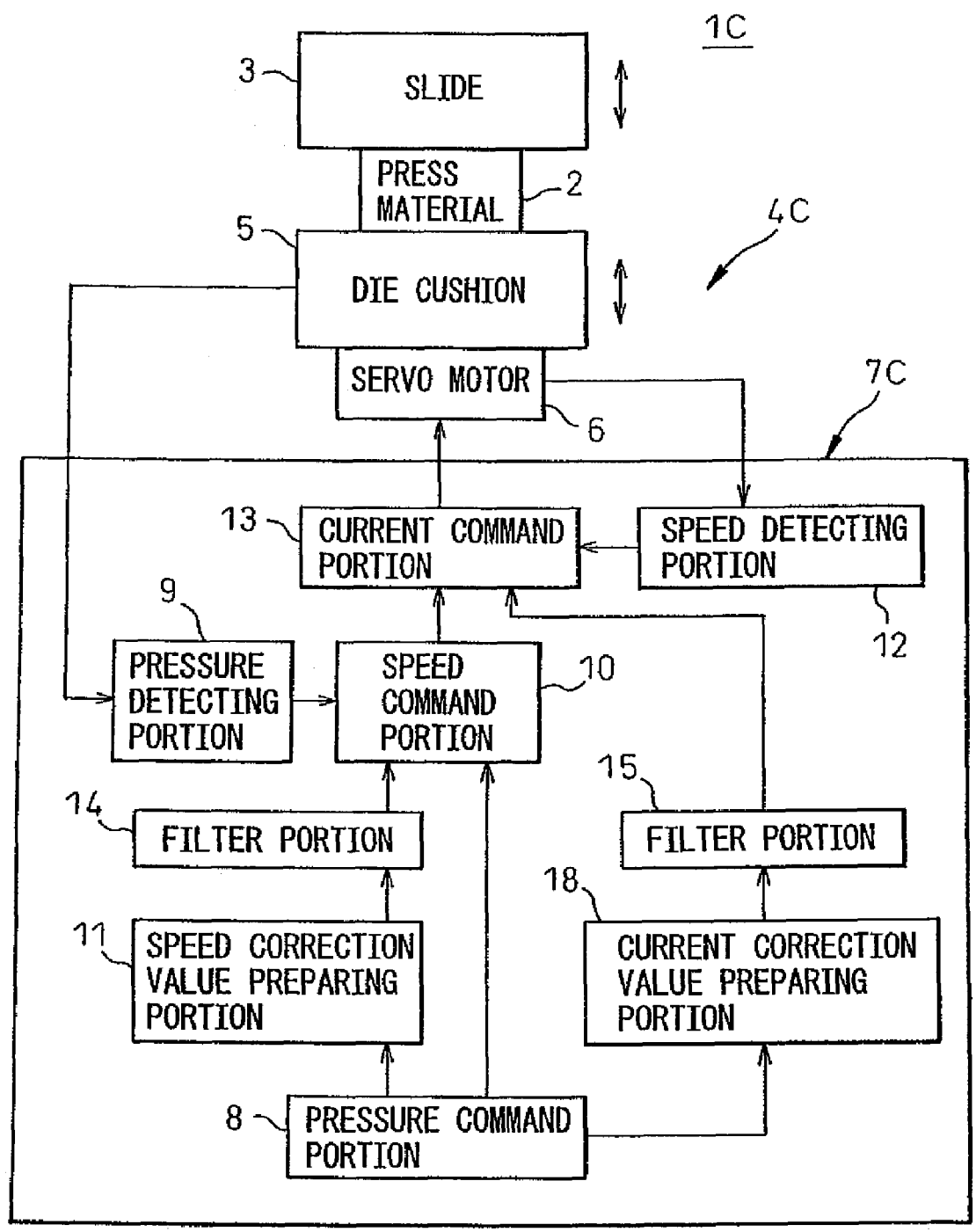
FIG. 5 is a view showing the construction of a die cushion controller according to a third embodiment of the present invention.
Figure 6:
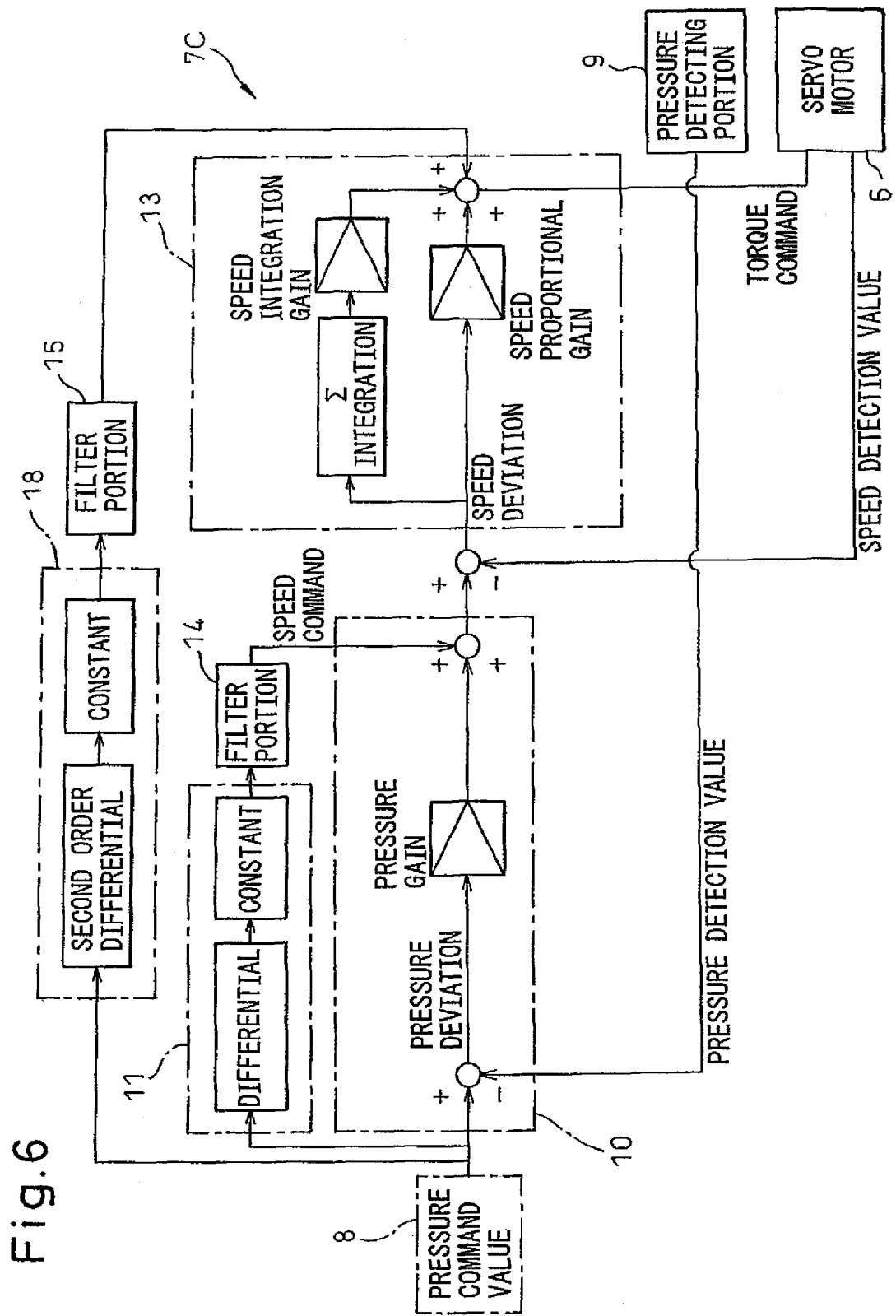
FIG. 6 is a block diagram showing the die cushion controller of FIG. 5.

Next, FIGS. 5 and 6 show a die cushion controller according to a third embodiment of the present invention. Constituents common to the present embodiment and the first embodiment are denoted by same reference numerals and symbols, and an explanation thereof is omitted.

A die cushion controller 7C of the present embodiment includes the speed correction value preparing portion 11 of the die cushion controller 7A of the first embodiment and the current correction value preparing portion 18 of the die cushion controller 7B of the second embodiment. In accordance with the present embodiment, a synergistic effect of the speed correction value preparing portion 11 and the current correction value preparing portion 18 permits the follow-up performance of the servo motor 6 to be further improved.

Figure 7:
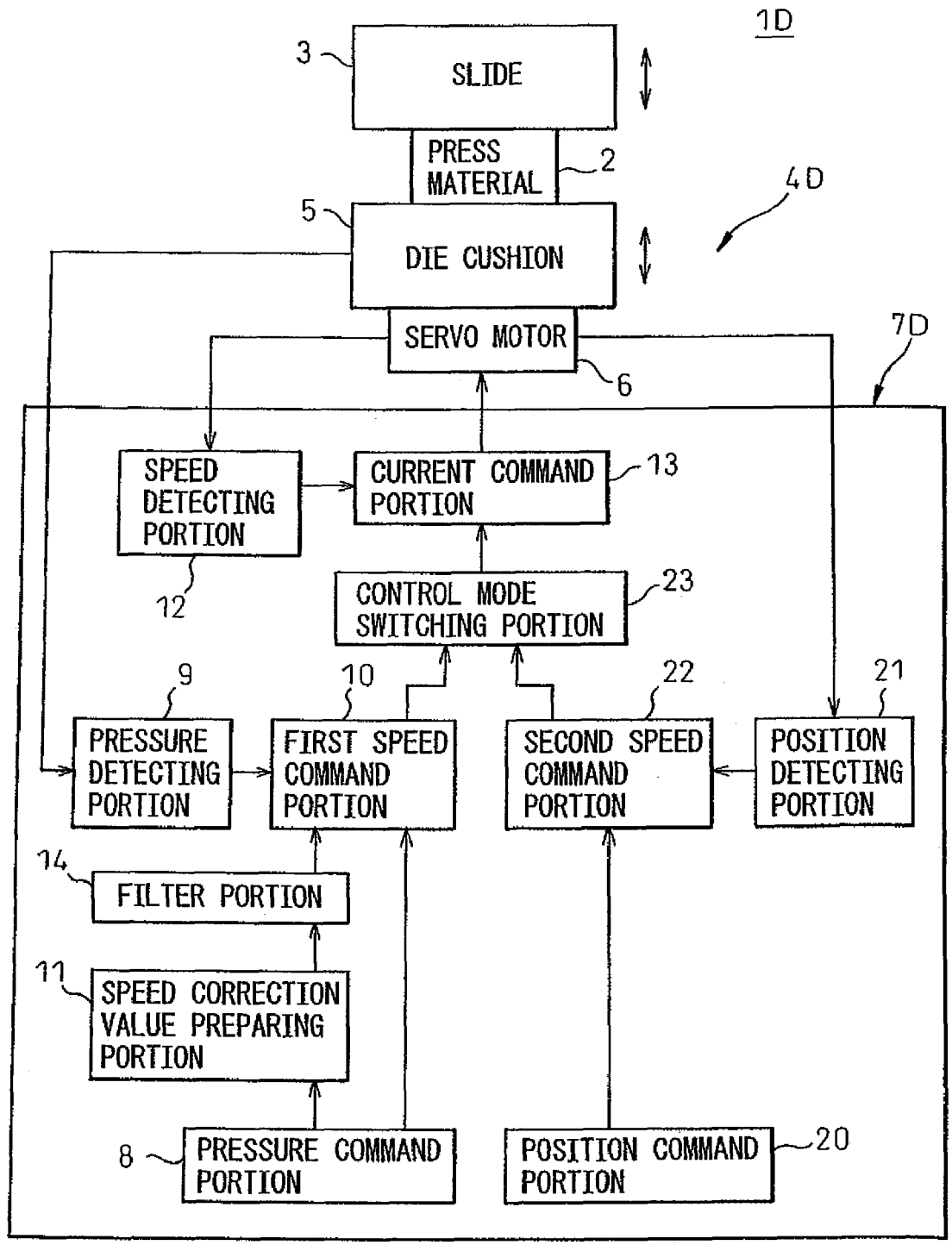
FIG. 7 is a view showing the construction of a die cushion controller according to a fourth embodiment of the present invention.
Figure 8:
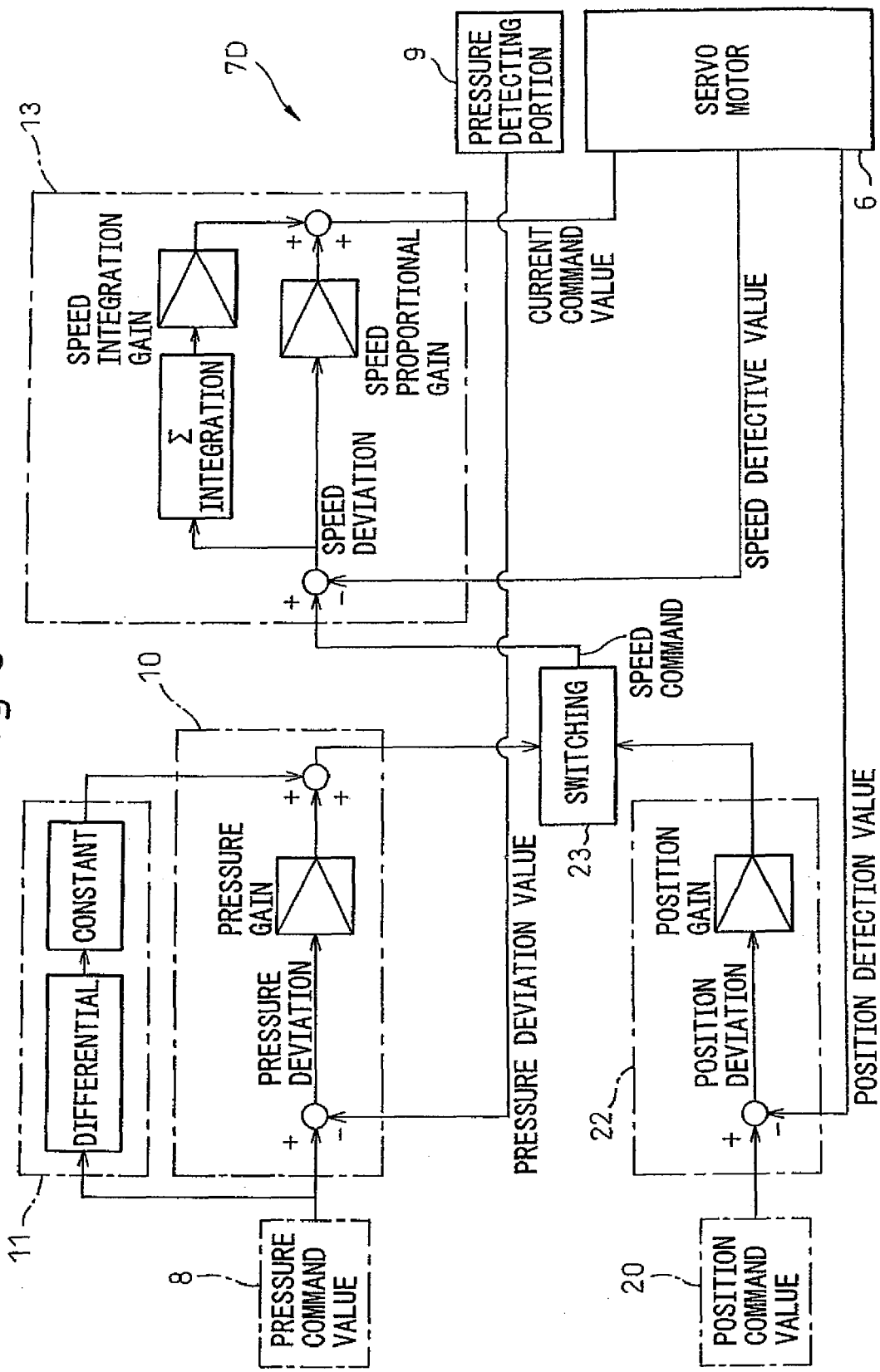
FIG. 8 is a block diagram showing die cushion controller of FIG. 7.

Next, referring to FIGS. 7 and 8, a die cushion controller according to a fourth embodiment of the present invention will be described. Constituents common to the present embodiment and the first embodiment are denoted by same reference numerals and symbols, and an explanation thereof is omitted.

A die cushion controller 7D of the present embodiment includes a control mode switching portion 23 for switching between the first speed command portion 10 for performing pressure control and a second speed command portion 22 for performing position control. The second speed command portion 22 is a constituent which prepares a second speed command value by multiplying a position deviation corresponding to the difference between a position command value instructed by a position command portion 20 and a position detection value detected by a position detecting portion 21 by a position gain, and are disposed in parallel to the first speed command portion 10. The first speed command portion 10 is the same constituents as the speed command portion 10 of the first to third embodiments.

The position command portion 20 is a constituent for controlling relative position of the die cushion 5 during non-press working, which prepares a position command value and control the servo motor 6 based on the prepared position command value. Control of the servo motor 6 based on the position command value is distinguished from the above-described pressure control of the servo motor 6 based on the pressure command value, and may be called as position control.

The position detecting portion 21 is composed of, for example, an encoder, a linear scale, or the like, and is provided in the die cushion, or the like, in order to detect an actual position of the die cushion 5 during non-press working. The position deviation corresponding to the difference between the position command value and the actual position is determined by feed-back of the actual position detected by the position detecting portion 21 to the position command value (see FIG. 8).

The control mode switching portion 23 is constituent which selects either one of the first speed command portion 10 and the second speed command portion 22, for interconnecting it with the current command portion 13. The control mode switching portion 23 select the first speed command portion 10 during press working and perform pressure control, and select the second speed command portion 22 during non-press working and perform position control. By thus switching between the first speed command portion 10 and the second speed command portion 22, it is possible to freely change the exerted pressure and properly adjust the magnitude of the exerted pressure during press working, and to accurately perform relative positioning of the die cushion 5 during non-press working.

The present invention is not limited to above-described embodiments, but can be implemented in various variations and modifications without departing from the concept of the present invention. For example, although the filter portion 14, 15 are provided for filter processing of the correction value to be added to the speed command value or the current command value in the first to fourth embodiments, the filter portion can be omitted.

While the invention has been described with reference to specific embodiments chosen for purpose of illustration, it should be apparent that numerous modifications could be made thereto, by those skilled in the art, without departing from the basic concept and scope of the invention.

The invention claimed is:

1. A die cushion controller for controlling a servo motor to drive a die cushion disposed in opposition to a slide of a press machine, said die cushion controller comprising:
   a pressure command portion for preparing a pressure command value corresponding to a predetermined pressure to be exerted on a press material disposed between the slide and the die cushion;
   a pressure detecting portion for detecting an actual pressure exerted on the press material;
   a speed correction value preparing portion for preparing a speed correction value by multiplying a differential value of the pressure command value prepared by the pressure command portion by a coefficient;
   a first speed command portion for preparing a first speed command value based on (i) the pressure command value prepared by the pressure command portion, (ii) the actual pressure detected by the pressure detecting portion, and (iii) the speed correction value prepared by the speed correction value preparing portion;
   a position command portion for preparing a position command value corresponding to a predetermined position to which the die cushion is to be moved by the servo motor;
   a position detecting portion for detecting an actual position of the die cushion;
   a second speed command portion for preparing a second speed command value based on (a) the position command value prepared by the position command portion and (b) the actual position detected by the position detecting portion; and
   a control mode switching portion for switching between the first speed command portion and the second speed command portion to output the first speed command value or the second speed command value, respectively.

2. A die cushion controller according to claim 1, further comprising:
   a speed detecting portion for detecting an actual rotational speed of the servo motor;
   a current correction value preparing portion for preparing a current correction value by multiplying a second order differential value of the pressure command value prepared by the pressure command portion by a coefficient; and
   a current command portion for preparing a current command value to be instructed to the servo motor based on (1) the first or second speed command value outputted by the control mode switching portion, (2) the actual rotational speed detected by the speed detecting portion, and (3) the current correction value prepared by the current correction value preparing portion.

3. A die cushion controller according to claim 1, further comprising:
   a filter portion for smoothing a waveform of the speed correction value.

4. A die cushion controller for controlling a servo motor to drive a die cushion disposed in opposition to a slide of a press machine, said die cushion controller comprising:
   a pressure command portion for preparing a pressure command value corresponding to a predetermined pressure to be exerted on a press material disposed between the slide and the die cushion;
   a pressure detecting portion for detecting an actual pressure exerted on the press material;
   a first speed command portion for preparing a first speed command value based on (i) the pressure command value prepared by the pressure command portion and (ii) the actual pressure detected by the pressure detecting portion;
   a speed detecting portion for detecting an actual rotational speed of the servo motor;
   a current correction value preparing portion for preparing a current correction value by multiplying a second order differential value of the pressure command value prepared by the pressure command portion by a coefficient;
   a position command portion for preparing a position command value corresponding to a predetermined position to which the die cushion is to be moved by the servo motor;
   a position detecting portion for detecting an actual position of the die cushion;
   a second speed command portion for preparing a second speed command value based on (a) the position command value prepared by the position command portion and (b) the actual position detected by the position detecting portion;
   a control mode switching portion for switching between the first speed command portion and the second speed command portion to output the first speed command value or the second speed command value, respectively; and
   a current command portion for preparing a current command value to be instructed to the servo motor based on (1) the first or second speed command value outputted by the control mode switching portion, (2) the actual rotational speed detected by the speed detecting portion, and (3) the current correction value prepared by the current correction value preparing portion.

5. A die cushion controller according to claim 4, further comprising:
   a filter portion for smoothing a waveform of the current correction value.

* * * * *